(12) United States Patent
Inoue et al.

(10) Patent No.: US 6,861,153 B2
(45) Date of Patent: Mar. 1, 2005

(54) THERMOPLASTIC RESIN COMPOSITION

(75) Inventors: Kouichi Inoue, Tokyo (JP); Toshimi Yamanaka, Tokyo (JP); Takeshi Yuasa, Tokyo (JP)

(73) Assignee: Riken Technos Corporation, Tokyo (JP)

( * ) Notice: Subject to any disclaimer, the term of this patent is extended or adjusted under 35 U.S.C. 154(b) by 356 days.

(21) Appl. No.: 10/386,641

(22) Filed: Mar. 12, 2003

(65) Prior Publication Data

US 2003/0171493 A1 Sep. 11, 2003

Related U.S. Application Data

(62) Division of application No. 09/932,554, filed on Aug. 17, 2001, now Pat. No. 6,559,232.

(30) Foreign Application Priority Data

Aug. 18, 2000 (JP) ........................................ 2000-248927

(51) Int. Cl.⁷ .......................... B32B 27/08; B32B 27/30; B32B 27/32
(52) U.S. Cl. ........................ 428/520; 428/515; 428/522; 428/523; 428/500
(58) Field of Search ................................ 428/500, 515, 428/520, 522, 523

(56) References Cited

PUBLICATIONS

European Search Report dated Nov. 23, 2001.

*Primary Examiner*—James J. Seidieck
*Assistant Examiner*—Thao Tran
(74) *Attorney, Agent, or Firm*—Pitney, Hardin, Kipp & Szuch LLP

(57) ABSTRACT

The present invention provides a thermoplastic resin composition comprising (a) 100 parts by weight of a resin selected from the group consisting of polypropylenes and copolymers composed mainly of propylene, (b) 5 to 350 parts by weight of a resin selected from the group consisting of polyethylenes and copolymers composed mainly of ethylene, the resin having been prepared using a single site catalyst, and (c) 5 to 200 parts by weight of an ionomer resin or its ester. The present thermoplastic resin composition is excellent in mechanical properties and heat bonding property to various resins, and causes no bleeding-out of softening agents, thereby the softness of the shaped articles obtained from the composition can be easily controlled. The present invention also provides a laminated article comprising a layer of the resin composition .

10 Claims, 1 Drawing Sheet

THERMOPLASTIC RESIN COMPOSITION

REFERENCE TO RELATED APPLICATIONS

This is a division of U.S. patent application Ser. No. 09/932,554 filed on Aug. 17, 2001 now U.S. Pat. No. 6,559,232.

FIELD OF THE INVENTION

The present invention relates to a thermoplastic resin composition, more specifically a thermoplastic resin composition useful for composite molded articles such as automobile moldings.

PRIOR ART

Automobile parts, building parts and light electrical appliance parts were prepared by composite molding, e.g., by two-color molding, multiple different resins. Such composite molded automobile parts include window flames and lamp packing, building parts include sash flames, and light electrical appliance parts include push buttons for telephones, wireless installations, TV remote controllers and VTR remote controllers.

In general, parts are separately molded from each different resin and bonded with each other by an adhesive, or male part and female part are molded from different resins and fit into each other to obtain a composite molded article composed of multiple different resins.

However, the method with an adhesive has drawbacks that costs are high due to a complicated step of applying an adhesive and a skill is required to apply an adhesive effectively. The method of providing parts to be fit into has drawbacks that a necessary complicated mold raises costs and a fitting-into step worsens workability.

Then, it was proposed that parts from specific resins are heat bonded with each other to make a composite article, as described in Japanese Patent Application Laid-Open Nos. Sho-61-213145/1986, Sho-63-115711/1988, Hei-1-139240/1989, Hei-1-139241/1989, and Hei-2-139232/1990. However, it is difficult to control softness of the articles made from any of the compositions described in those publications. It is usually done to add an oil for easier control of softness of molded articles. However, if an oil is added to the aforesaid previous compositions it is observed that the oil bleeds out from the surface of the resultant molded article or from the interface between the resins. Accordingly, bonding strength between the resins is week. Therefore, the molded article causes coming-off after a prolonged use.

In composite automobile moldings such as window moldings, roof moldings, protector moldings, weather moldings, and strip moldings, parts which are exposed outside must be resilient and excellent in anti-scratch resistance, weatherability and chemical resistance. Recently, olefin resins and styrene resins are used for those automobile moldings. However, those have a very strong restoring force against bend and, therefore, it is very difficult to bend and fit those into automobiles. In addition, the surface is easily scratched, so that beautiful gloss cannot be attained.

Hard olefinic polymers such as oinomers, ethylene-acrylic acid copolymers, ethylene-methacrylic acid copolymers, ethylene-acrylic acid ester copolymers, and ethylene-methacrylic acid ester copolymers, are used in the surface skin layer of moldings to successfully improve anti-scratch resistance, weatherability and chemical resistance, as described in Japanese Utility Model Application Laid-Open Nos. Hei-5-32152/1993 and Hei-7-26217/1995. However, when a thermoplastic elastomer composition which has a weak restoring force against bend is used in a substrate, the surface layer composed of the hard olefinic polymer does not well bond to the substrate and comes off.

In various composite molded articles, a thermoplastic elastomer composition is desired to have good heat adhesion with various resins. Previously, polyolefinic thermoplastic elastomers (TPO) can be heat bonded to homologous polyolefinic resins, but are difficult to be heat bonded to ethylene-acrylic acid copolymers, ethylene-methacrylic acid copolymers and oinomers which have a polar group. This is problematic in broadening its applications. Particularly in automobile lace parts, if TPO is used as a core material, only polyolefinic resin can be used as a surface skin, so that there is a limitation on resins to be used.

SUMMARY OF THE INVENTION

Accordingly, a purpose of the present invention is to provide a resin composition which has excellent mechanical properties and shows excellent heat adhesion with various resins, and further shows no bleeding of a softening agent and, therefore, allows easier control of softness of a molded article, and a layered molded article having a layer composed of this resin composition.

The present inventors have now found that the aforesaid purpose is attained by blending the following components (a) through (f) in the specified amounts.

Thus, the present invention is a thermoplastic resin composition comprising
(a) 100 parts by weight of a resin selected from the group consisting of polypropylenes and copolymers composed mainly of propylene,
(b) 5 to 350 parts by weight of a resin selected from the group consisting of polyethylenes and copolymers composed mainly of ethylene, the resin having been prepared using a single site catalyst,
(c) 5 to 200 parts by weight of a resin selected from the group consisting of
  (c-1) ethylenic ionomer resins, and
  (c-2) polymers and copolymers of 100 to 5% by weight of a monomer represented by the following formula (I):

$$CH_2=C(R^1)-COOR^2 \qquad (I)$$

wherein $R^1$ represents a hydrogen atom or a methyl group, and $R^2$ represents a hydrogen atom or an alkyl group having 1 to 10 carbon atoms, with 0 to 95% by weight of ethylene,
(d) 0 to 200 parts by weight of a resin selected from the group consisting of polyethylenes and copolymers composed mainly of ethylene, precluding those prepared using a single site catalyst,
(e) 0 to 400 parts by weight of a block copolymer consisting of at least two polymeric blocks (A) composed mainly of a vinyl aromatic compound and at least one polymeric block (B) composed mainly of a conjugated diene compound, or a hydrogenated block copolymer obtained by hydrogenating said block copolymer, and
(f) 0 to 500 parts by weight of a non-aromatic softening agent for rubber.

In a preferred embodiment, the composition comprises 10 to 250 parts by weight of the resin (b) selected from the group consisting of polyethylenes and copolymers composed mainly of ethylene having been prepared using a single site catalyst.

In another preferred embodiment, the composition comprises 10 to 200 parts by weight of the resin (b) selected from the group consisting of polyethylenes and copolymers composed mainly of ethylene having been prepared using a single site catalyst.

In another preferred embodiment, the resin (b) selected from the group consisting of polyethylenes and copolymers composed mainly of ethylene having been prepared using a single site catalyst, is an ethylene-octene copolymer.

In another preferred embodiment, the composition comprises 10 to 180 parts by weight of the resin selected from the group consisting of components (c-1) and (c-2).

In another preferred embodiment, the composition comprises 10 to 150 parts by weight of the resin (d) selected from the group consisting of polyethylenes and copolymers composed mainly of ethylene, precluding those prepared using a single site catalyst.

In another preferred embodiment, the composition comprises 30 to 350 parts by weight of the block copolymer (e) consisting of at least two polymeric blocks (A) composed mainly of a vinyl aromatic compound and at least one polymeric block (B) composed mainly of a conjugated diene compound, or a hydrogenated block copolymer obtained by hydrogenating said block copolymer.

In another preferred embodiment, the composition comprises 40 to 200 parts by weight of the non-aromatic softening agent for rubber (f).

Another aspect of the invention is a laminated article comprising a layer of the above thermoplastic resin.

Another aspect of the invention is a laminated article comprising a layer of the above thermoplastic resin and a layer of one or more resins selected from the group consisting of polar resins selected from the group consisting of ethylene-acrylic acid copolymers, ethylene-methacrylic acid copolymers, ethylene-acrylic acid ester copolymers, ethylene-methacrylic acid ester copolymers, ethylene-vinyl acetate copolymers, saponified ethylene-vinyl acetate copolymers and ionomer resins, and non-polar resins selected from the group consisting of non-polar polyolefinic resins and non-polar polystyrenic resins.

In a preferred embodiment, the non-polar polyolefinic resins include polypropylenes, propylene-α-olefin copolymers, polyethylenes, ethylene-α-olefin copolymeric rubbers, polybutenes., polyisobuthylenes, polybutadienes (BR), poly-4-methylpentene-1 resins, and olefinic thermoplastic elastomers.

In another preferred embodiment, the non-polar polystyrenic resins include polystyrenes, styrenic copolymeric rubbers, and styrenic thermoplastic elastomers.

In another preferred embodiment, the styrenic copolymeric rubbers include SBR, SBS, SIS, SIBS, SEBS, and SEEPS.

Another aspect of the invention is a shaped article having a core comprising the above thermoplastic resin composition, a surface layer of a polar resin and a lip of a non-polar resin.

In a preferred embodiment, the polar resin is selected from the group consisting of ethylene-acrylic acid copolymers, ethylene-methacrylic acid copolymers, ethylene-acrylic acid ester copolymers, ethylene-methacrylic acid ester copolymers, ethylene-vinyl acetate copolymers, saponified ethylene-vinyl acetate copolymers and ionomer resins, and the non-polar resin is selected from the group consisting of non-polar polyolefinic resins and non-polar polystyrenic resins.

In another preferred embodiment, the polar resin is an ionomer resin and the non-polar resin is a polyolefinic thermoplastic elastomer or a styrenic thermoplastic elastomer.

In another preferred embodiment, the article is a molding for automobiles.

In another preferred embodiment, the molding for automobiles is a window molding, a roof molding, a protector molding, a weather molding or a strip molding.

In the Figures, numeral 1 represents a specimen for the evaluation of adhesion and symbol A represents a bonded part. Numeral 2 represents a resin plate composed of an ionomer resin or a polypropylene resin. Numeral 3 represents a strip composed of the present composition or a comparative composition and numeral 4 represents a sheet of paper.

Figure 1:
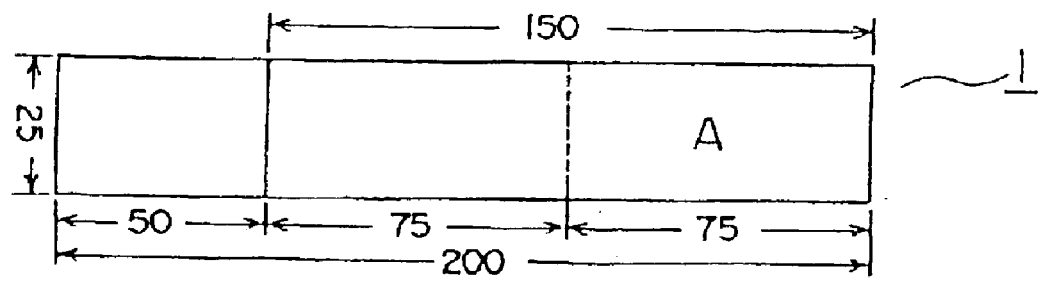
FIG. 1 is a schematic plan view of a specimen for the evaluation of adhesion.

The sizes in FIG. 1 are in millimeter.

PREFERRED EMBODIMENTS OF THE INVENTION

The components which constitute the present thermoplastic resin composition will be specifically described below
Component (a): Essential Component The polypropylenes and copolymers composed mainly of propylene include propylene homopolymers, copolymers of propylene and ethylene, copolymers of propylene and other α-olefin and copolymers of propylene, ethylene and other α-olefin. In the above copolymers, the α-olefin preferably has 4 to 8 carbon atoms, for example, butene-1, hexene-1, 4-methyl-1-pentene, and octene-1. At least one selected from these α-olefins is subjected to copolymerization.

The copolymers of propylene and ethylene, the copolymers of propylene and other α-olefin, and the copolymers of propylene, ethylene and other α-olefin may be a random copolymer or a block copolymer. A random copolymer is preferred.

In the above copolymers, the content of ethylene is preferably 50% by weight or less, more preferably 0 to 15% by weight, still more preferably 1 to 13% by weight, particularly 2 to 10% by weight. The content of ethylene may be determined by infrared spectroscopy and so on. The content of α-olefin is preferably 0 to 40% by weight, more preferably 1 to 40% by weight.
Component (b): Essential Component As the polyethylenes and copolymers composed mainly of ethylene which have have been prepared using a single site catalyst, use may be preferably made of one or more substances selected from polyethylenes, for instance, high density polyethylenes (polyethylene prepared in a low pressure method), low density polyethylenes (polyethylene prepared in a high pressure method), linear low density polyethylenes (copolymers of ethylene with a smaller amount, preferably 1 to 10 molar % of α-olefin such as butene-1, hexene-1 or octene-1); and ethylene-propylene copolymers, which have all been prepared with a single site catalyst, i.e., metallocene catalyst. Particularly preferred substances are ethylene-octene copolymers which have been prepared using a single site catalyst (metallocene catalyst). These copolymers may be used alone or preferably in a combination of two or more. Polyethylenes and copolymers composed mainly of ethylene which have been prepared using a catalyst other than the single site catalysts have poor compatibitily with component (a) and decrease mechanical strength of the composition obtained.

Component (b) is blended in an amount of at most 350 parts by weight, preferably at most 250 parts by weight, more preferably at most 200 parts by weight, and at least 5 parts by weight, preferably at least 10 parts by weight, per 100 parts by weight of component (a). If the amount is less than the lower limit, the dispersion of components (c-1) and (c-2) deteriorates. If it exceeds the above upper limit, heat resistance of the thermoplastic resin composition obtained is poor.

Component (c): Essential Component
(c-1) Ethylenic Ionomer Resin

The ethylenic ionomer resin is an ethylene-α,β-unsaturated carboxylic acid copolymer or ethylene-α,β-unsaturated carboxylic acid-α,β-unsaturated carboxylic acid ester copolymer wherein a part of the carboxyl groups has been neutralized and crosslinked with metal ions.

In the above ethylene copolymer before neutralized, the ratio of the ethylene unit is preferably 75 to 99.5 mole %, more preferably 88 to 98 mole %, the ratio of the α,β-unsaturated carboxylic acid unit is preferably 0.5 to 15 mole %, more preferably 1 to 6 mole %, and the ratio of the α,β-unsaturated carboxylic acid ester unit is preferably 0 to 10 mole %, more preferably 0 to 6 mole %. If the ratio of the α,β-unsaturated carboxylic acid unit is less than 0.5 mole %, adhesion of the ethylenic ionomer resin obtained is lost. If it exceeds 15 mole %, heat resistance of the ethylenic ionomer resin obtained decreases. The existence of the α,β-unsaturated carboxylic acid ester unit in the above ratio can give softness to the ethylenic ionomer resin obtained. If the ratio of the α,β-unsaturated carboxylic acid ester unit exceeds 10 mole %, heat resistance of the ethylenic ionomer resin obtained decreases.

As the α,β-unsaturated carboxylic acid constituting the above copolymer, use may be preferably made of those having 3 to 8 carbon atoms, more preferably, acrylic acid, methacrylic acid, maleic acid, fumaric acid and maleic anhydride. As the α,β-unsaturated carboxylic acid ester, use may be preferably made of those having 4 to 8 carbon atoms, more preferably, methyl acrylate, methyl methacrylate, ethyl acrylate, ethyl methacrylate, isobutyl acrylate, butyl methacrylate and dimethyl phthalate. More particularly, acrylic acid or methacrylic acid is used as the α,β-unsaturated carboxylic acid, and isobutyl acrylate is used as the α,β-unsaturated carboxylic acid ester.

Of the carboxyl groups of the above ethylene copolymer, a ratio of those which are neutralized with metal ions (degree of neutralization) is preferably 5 to 80%, more preferably 10 to 75%. If the degree of neutralization of carboxyl groups with a metal ion is less than 5%, surface gloss and chemical resistance of the ethylenic ionomer resin obtained decrease. If it exceeds 80%, flowability of the ethylenic ionomer resin obtained becomes lower.

The metal ion includes those having a valence of 1 to 3, particularly those of the groups I, II, III, IV and VII in the periodic table, such as $Na^-$, $K^+$, $Li^+$, $Cs^-$, $Ag^+$, $Hg^+$, $Cu^+$, $Be^{++}$, $Mg^{++}$, $Ca^{++}$, $Sr^{++}$, $Ba^{++}$, $Cu^{++}$, $Cd^{++}$, $Hg^{++}$, $Sn^{++}$, $Pb^{++}$, $Fe^{++}$, $Co^{++}$, $Ni^{++}$, $Zn^{++}$, $Al^{+++}$, $Sc^{+++}$, $Fe^{+++}$, and $Y^{+++}$. Such metal ions may be used as a mixture of two or more or as a mixture with ammonium ion. Of these metal ions, $Zn^{++}$ and $Na^+$ are particularly preferred.

(c-2) Polymers and Copolymers of 100 to 5% by Weight of a Monomer Represented by the Following Formula (I)

$$CH_2=C(R^1)-COOR^2 \qquad (I)$$

wherein $R^1$ represents a hydrogen atom or a methyl group, and $R^2$ represents a hydrogen atom or an alkyl group having 1 to 10 carbon atoms, with 0 to 95% by weight of ethylene The contents of ethylene and the monomer represented by the formula (I) in the above (co)polymer are preferably 20 to 95% by weight and 80 to 5% by weight, respectively, more preferably 50 to 95% by weight and 50 to 5% by weight, particularly 80 to 95% by weight and 20 to 5% by weight. respectively. If the content of the monomer represented by the formula (I) is less than the lower limit, adhesion between the composition obtained and a resin selected from ethylene-acrylic acid copolymers, ethylene-methacrylic acid copolymers, ethylene-acrylic acid ester copolymers, ethylene-methacrylic acid ester copolymers, ethylene-vinyl acetate copolymers, saponified ethylene-vinyl acetate copolymers and ionomer resins is not enough. If it exceeds the above upper limit, a restoring force from bend of the composition obtained tends to become too higher. The monomer represented by the above formula (I) includes methyl methacrylate, methyl acrylate, ethyl methacrylate, methacrylic acid and acrylic acid with methacrylic acid being particularly preferred.

In addition, the above (co) polymer preferably has a melt flow rate of 0.5 to 15 g/10 min, determined at a temperature of 190° C. and with a load of 2,160 g according to JIS K 6760.

Component (C) is blended in an amount of at most 200 parts by weight, preferably at most 180 parts by weight, and at least 5 parts by weight, preferably at least 10 parts by weight, per 100 parts by weight of component (a). If the amount is less than the above lower limit, there takes place a problem that adheseion between the composition obtained and a resin selected from ethylene-acrylic acid copolymers, ethylene-methacrylic acid copolymers, ethylene-acrylic acid ester copolymers, ethylene-methacrylic acid ester copolymers, ethylene-vinyl acetate copolymers, saponified ethylene-vinyl acetate copolymers and ionomer resins is poor. If it exceeds the above upper limit, heat resistance of the composition is poor.

Component (d): Optional Component

Polyethylenes and copolymers composed mainly of ethylene. precluding those prepared using a single site catalyst, are used mainly as an extender. As component (d), use may be preferably made of one or more selected from high density polyethylene (polyethylene prepared in a low pressure method), low density polyethylene (polyethylene prepared in a high pressure method), linear low density polyethylene (copolymers of ethylene with a smaller amount, preferably 1 to 10 molar % of α-olefin such as butene-1, hexene-1 or octene-1); and olefinic copolymers such as ethylene-propylene copolymer, ethylene-vinyl acetate copolymer and ethylene-acrylate copolymer, which are all prepared using a catalyst other than single site catalysts. Particularly, linear low density polyethylene is preferably used.

Component (d) is blended in an amount of 0 to 200 parts by weight, preferably 1 to 200 parts by weight, more preferably 10 to 150 parts by weight, per 100 parts by weight of component (a). If the amount exceeds 200 parts by weight, there takes place a problem that heat resistance of the resin composition is poor.

Component (e): Optional Component

Component (e) used in the invention is a block copolymer consisting of at least two polymeric blocks (A) composed mainly of a viny aromatic compound and at least one polymeric block (B) composed mainly of a conjugated diene compound, or a hydrogenated block copolymer obtained by hydrogenating said block copolymer, or a mixture thereof, for instance vinyl aromatic compound-conjugated diene compound block copolymers having a structure, A-B-A, B-A-B-A or A-B-A-B-A, or ones obtained by hydrogenating those. The block copolymer or the hydrogenated block copolymer (hereinafter referred to as (hydrogenated) block copolymer) contains 5 to 60% by weight, preferably 20 to 50% by weight, of a vinyl aromatic compound. Preferably, the polymeric block A composed mainly of a vinyl aromatic compound consists wholly of a vinyl aromatic compound or is a copolymeric block comprising more than 50% by weight, preferably at least 70% by weight, of a vinyl aromatic compound and an optional component such as a conjugated diene compound or a hydrogenated conjugated diene compound (hereinafter referred to as (hydrogenated) conjugated diene compound). Preferably, the polymeric block B composed mainly of a (hydrogenated) conjugated diene compound is composed solely of a (hydrogenated) conjugated diene compound or is a copolymeric block comprising more than 50% by weight, preferably at least 70% by weight, of a (hydrogenated) conjugated diene compound and an optional component such as a vinyl aromatic compound. The vinyl compound or the (hydrogenated) conjugated diene compound may be distributed at random, in a tapered manner (i.e., a monomer content increases or decreases along a molecular chain), in a form of partial block or mixture thereof in the polymeric block A composed mainly of a vinyl aromatic compound or the polymeric block B composed mainly of a (hydrogenated) conjugated diene compound. When two or more of the polymeric block A composed mainly of a vinyl aromatic compound or two or more of the polymeric block B composed mainly of a (hydrogenated) conjugated diene compound are present, they may be same with or different from each other in structure.

The vinyl aromatic compound to compose the (hydrogenated) block copolymer may be one or more selected from, for instance, styrene, α-methyl styrene, vinyl toluene and p-tert.-butyl styrene, preferably styrene. The conjugated diene compound may be one or more selected from, for instance, butadiene, isoprene, 1,3-pentadiene, and 2,3-dimethyl-1,3-butadiene, preferably butadiene, isoprene and combination thereof.

Any micro structure may be selected in the polymeric block B composed mainly of the conjugated diene compound. When the block B is composed solely of butadiene, it is preferred that the butadiene block has 20 to 50%, more preferably 25 to 45%, of 1,2-micro structure. When the block B is composed of a mixture of isoprene and butadiene, it is preferred that the block has less than 50%, more preferably less than 25%, still more preferably less than 15%, of 1,2-micro structure. When the block B is composed solely of isoprene, it is preferred that 70 to 100% by weight of isoprene is in 1 4-micro structure and at lest 90% of the aliphatic double bonds derived from isoprene is hydrogenated.

A weight average molecular weight of the (hydrogenated) block copolymer with the aforesaid structure to be used in the invention is preferably 5,000 to 1,500,000, more preferably 10,000 to 550,000, further more preferably 100,000 to 550,000, particularly 10,000 to 400,000. A ratio of the weight average molecular weight (Mw) to the number average molecular weight (Mn) Mw/Mn, is preferably 10 or less, more preferably 5 or less, particularly 2 or less.

Molecule structure of the (hydrogenated) block copolymer may be linear, branched, radial or any combination thereof.

Many methods were proposed for the preparation of such block copolymers. As described, for instance, in JP Publication 40-23798/1965, block polymerization may be carried out using a lithium catalyst or a Ziegler catalyst in an inert solvent. The hydrogenated block copolymer may be obtained by hydrogenating the block copolymer thus obtained in the presence of a hydrogenation catalyst in an inert solvent.

Examples of the (hydrogenated) block copolymer include SBS, SIS, SEBS, SEPS and SEEPS. A particularly preferred (hydrogenated) block copolymer in the invention is a hydrogenated block copolymer with a weight average molecular weight of 50,000 to 550,000 which is composed of polymeric block A composed mainly of styrene and polymeric block B which is composed mainly of isoprene and in which 70 to 100% by weight of isoprene has 1,4-micro structure and at least 90% of the aliphatic double bonds derived from isoprene is hydrogenated. More preferably, 90 to 100% by weight of isoprene has 1,4-micro structure in the aforesaid hydrogenated block copolymer.

Component (e) may be blended in an amount of 0 to 400 parts by weight, preferably 30 to 350 parts by weight, per 100 parts by weight of component (a) to give softness to the resin composition. If the amount exceeds 400 parts by weight, processability of the resin composition is poor.

Component (f) Optional Component

Non-aromatic mineral oils and non-aromatic liquid or low molecular weight synthetic softening agents may be used as component (f) of the invention. Mineral oil softening agents used for rubber are mixtures of aromatic cyclic ones, napthenic cyclic ones and paraffinic ones. Those in which 50% or more of the whole carbon atoms is in paraffinic chains are called a paraffinic type; those in which 30 to 40% of the whole carbon atoms is in naphthenic rings are called a naphthenic type; and those in which 30% or more of the whole carbon atoms is in aromatic rings are called an aromatic type.

Mineral oil softening agents for rubber to be used as component (f) according to the invention are of the aforesaid paraffinic or naphthenic type. Aromatic softening agents are improper, because component (d) becomes soluble, which inhibits a crosslinking reacrion and therefore the physical properties of the composition are not improved. Paraffinic ones are preferred as component (f). Among the paraffinic ones, those with a less content of aromatic cyclic components are particularly preferred.

The non-aromatic softening agents for rubber have a kinetic viscosity at 37.8° C. of 20 to 500 cSt, a pour point of −10 to −15° C. and a flash point (COC) of 170 to 300° C.

Component (f) is blended in an amount of 0 to 500 parts by weight, preferably 0 to 200 parts by weight, per 100 parts by weight of component (a). If the amount exceeds the upper limit, bleeding-out of the softening agent tends to occur to give stickiness to a final product in some cases and the mechanical properties deteriorate. If the amount is less than 40 parts by weight, the softness required for the composition may not be obtained in some cases. It is preferred that component (f) has a weight average molecular weight of 100 to 2,000.

Component (g): Inorganic Filler (Optional Component)

Component (g), inorganic filler, may be blended as an optional component in the present resin composition. The filler includes, for example, calcium carbonate, talc, clay, carbon black, magnesium hydroxide, mica, barium sulfate, natural silica, synthetic silica, titanium oxide, magnesium oxide and zinc oxide.

Component (g) may be blended in an amount of 0 to 500 parts by weight, preferably 0 to 400 parts by weight, more preferably 0 to 300 parts by weight, per 100 parts by weight of component (a). If the amount exceeds the upper limit, bleeding-out of the softening agent tends to occur to give stickiness to a final product in some cases and the mechanical properties deteriorate. By blending component (g), inorganic filler, rigidity may be given to the resin composition. In addition, component (g) is effective as an extender for the reduction of costs and for improvement of appearance (gloss) of the shaped article.

When oil resistance and heat resistance are required for the thermoplastic resin composition, the following organic peroxide and crosslinking aid may be used together.

Component (h): Organic Peroxide (Optional Component)

Examples of the organic peroxides used in the invention include dicumyl peroxide, di-tert.-butyl peroxide, 2,5-dimethyl-2,5-di(tert.-butylperoxy) hexane, 2,5-dimethyl-2,5-di(tert.-butylperoxy) hexine-3, 1,3-bis(tert.-butylperoxyisopropyl)benzene, 1,1-bis(tert.-butylperoxy)-3,3,5-trimethylcyclohexane, n-butyl-4,4,-bis(tert.-butylperoxy)valerate, benzoylperoxide, p-chlorobenzoyl peroxide, 2,4-dichlorobenzyl peroxide, tert.-butylperoxy benzoate, tert.-butylperoxyisopropyl carbonate, diacetyl peroxide, lauroyl peroxide, and tert.-butylcumyl peroxide. These may be used alone or in a combination of two or more. Among those, most preferred are 2,5-dimethyl-2,5-di(tert.-butylperoxy)hexane and 2,5-dimethyl-2,5-di(tert.-butylperoxy)hexine-3 in terms of smell, coloring and scorch stability.

Component (h) is blended preferably in an amount of 0.1 to 3 parts by weight, per 100 parts by weight of component (a).

Component (i): Crosslinking Aid (Optional Component)

Examples of the crosslinking aid include polyfunctional methacrylate monomers such as ethyleneglycol dimethacrylate, diethyleneglycol dimethacrylate, triethyleneglycol dimethacrylate, polyethyleneglycol dimethacrylate, trimethylolpropane trimethacrylate and allyl methacrylate and polyfunctional vinyl monomers such as vinyl butylate, vinyl stearate, divinylbenzene and triallylcyanurate, Component (i) may be used to carry out a uniform and effective crosslinking reaction.

Component (i) is blended preferably in an amount of at least 0.1 part by weight, and preferably at most 10 parts by weight, more preferably at most 5 parts by weight, per 100 parts by weight of component (a).

The present resin composition may contain various conventional additives such as anti-blocking agents, sealing property-improving agents, heat stabilizers, antioxidants, UV absorbents, lubricants and colorants, depending on its applications, in addition to the aforesaid components.

The process for preparing the present resin composition is not particularly restricted. The present composition may be prepared by melt kneading the aforesaid components at the same time. The means for melt kneading are not restricted to particular ones and any conventional means may be used, such as single screw extruders, twin screws extruders, rolls, Banbury mixers, and various kneaders.

The present resin composition can be heat bonded well to various resins to form various laminated articles. Preferred examples of the resin capable of being heat bonded to the present resin composition include polar resins such as ethylene-acrylic acid copolymers, ethylene-methacrylic acid copolymers, ethylene-acrylic acid ester copolymers, ethylene-methacrylic acid ester copolymers, ethylene-vinyl acetate copolymers, saponified ethylene-vinyl acetate copolymers and ionomer resins, and non-polar resins such as non-polar polyolefinic resins and non-polar polystyrenic resins. The ionomer resins include ionomer resins of α-olefin such as propylene, beside the aforesaid ethylenic ionomer resins. Preferred examples of the non-polar polyolefinic resins include polypropylenes, propylene-α-olefin copolymers, polyethylenes such as low density polyethylene resins, linear low density polyethylene resins, medium density polyethylene resins and high density polyethylene resins, ethylene-α-olefin copolymeric rubbers, polybutenes, polyisobuthylenes, polybutadienes (BR), poly-4-methylpentene-1 resins, and olefinic thermoplastic elastomers (TPO) (elastomeric composition composed of ethylene-α-olefin copolymeric rubber, polypropylene and so on). Examples of the non-polar polystyrenic resins include polystyrenes such as general purpose polystyrene resins and high impact polystyrene resins, styrenic copolymeric rubbers such as SBR, SBS, SIS, SIBS, SEBS and SEEPS, and styrenic thermoplastic elastomers (elastomeric composition composed of styrenic copolymeric rubber, polyolefinic resin and so on). Particularly, ionomer resins and polypropylenes are preferably used.

In a preferred embodiment, shaped articles may be formed which have a core comprising the above resin composition of the present invention, a surface layer of a polar resin and a lip of a non-polar resin. The polar resin and the non-polar resin here may be the same as mentioned above. Preferably, the polar resin is an ionomer resin and the non-polar resin is a polyolefinic thermoplastic elastomer or a styrenic thermoplastic elastomer.

Such laminated articles may be used in various applications such as automobile parts, building parts and light electrical appliance parts. Particularly, they are useful for various moldings for automobiles such as window moldings, roof moldings, protector moldings, weather moldings and strip moldings which are fitted into automobiles. In particular, by using a laminainated article having a surface layer of an ionomer resin, parts of various moldings which are exposed outside can be rendered resilient and excellent in anti-scratch resistance, weatherability and chemical resistance. Laminating may be carried out by, for example, coextrusion molding, insert molding or transfer molding.

EXAMPLES

The present invention will be further elucidated with reference to the following Examples and Comparison Examples, which are not intended to limit the invention.

The following materials were used.

Component (a): propylene homopolymer, CJ700, trade mark, ex Mitsui Petrochemical Industries Inc., crystallization degree: Tm 166° C., ΔHm 82 mJ/mg.

Component (b): ethylene-octene copolymer, Engage EG8100, trade mark, ex Dow Chemical Japan Inc., density: 0.870 g/cm$^3$, melt index, determined at 190° C. and with a load of 2.16 kg: 0.5 g/10 min., comonomer content: 24%.

Component (c):

(c-1) ethylene-acrylic acid copolymer, Himilan 1554, trade mark, ex Mitsui-Du Pont Inc., MAA (methacrylic acid) content: 9.0% by weight, density: 0.94 g/cm$^3$, melting point: 99° C., melt index, determined at 190° C. and with a load of 2.16 kg 1.3 g/10 min., ion-crosslinked (metal salt: zinc).

(c-2) ethylene-acrylic acid copolymer, Nucleru N0903HC, trade mark. ex Mitsui-Du Pont Inc., MAA (methacrylic acid) content: 9.0% by weight,
density: 0.93 g/cm$^3$,
melting point: 99° C.,
melt index, determined at 190° C. and with a load of 2.16 kg: 1.3 g/10 min.

Component (d): LLDPE, V-0398CN, trade mark, ex Idemitsu Petrochemical Co.,
weight average molecular weight: 80,000,
density: 0.907 g/cm$^3$,
melt index, determined at 190° C. and with a load of 2.16 kg: 3.3 g/10 min.

Component (e): Septon 4077, trade mark, ex. Kuraray Inc.,
styrene content: 30% by weight,
isoprene content: 70% by weight,
number average molecular weight: 260,000,
weight average molecular weight: 320,000,
molecular weight distribution 1.23, and
hydrogenation ratio: at least 90%.

Component (f): paraffinic oil, Diana Process Oil, PW-90, trade mark, ex Idemitsu Kosan Co.,
weight average molecular weight: 540,
aromatic content: at most 0.1%.

Component (g): filler, calcium carbonate, NS-400, trade mark, ex Nitto Powder Industries Inc., Component (h): peroxide, 2,5-dimethyl-2,5-di(t-butylperoxy)hexane, Perhexa 25B, trade mark, ex Nippon Oil & Fats Co.

Component (i): crosslinking aid, triethylene glycol dimethacrylate, NK ester 3G, trade mark, ex Shin-Nakamura Chemical Co., The following tests and evaluations were carried out in the Examples and the Comparison Examples.

1) Specific gravity: determined in accordance with the Japanese Industrial Standards (JIS) K 6301. Pressed sheets having a thickness of 6.3 mm were used as test pieces.

2) Hardness: determined in accordance with JIS K 6301. Pressed sheets having a thickness of 6.3 mm were used as test pieces. Hardness after 15 seconds was determined.

3) Tensile strength: determined in accordance with JIS K 6301 using a test piece which was obtained by punching out a pressed sheet having a thickness of 1 mm by a No. 3 dumbbell die. The tensile speed was 500 mm/min.

4) Modulus at 100% elongation: determined in accordance with JIS K 6301 using a test piece which was obtained by punching out a pressed sheet having a thickness of 1 mm by a No. 3 dumbbell die. The tensile speed was 500 mm/min.

5) Tensile elongation: determined in accordance with JIS K 6301 using a test piece which was obtained by punching out a pressed sheet having a thickness of 1 mm by a No. 3 dumbbell die. The tensile speed was 500 mm/min.

6) Compression set: determined in accordance with JIS K 6262 using a pressed sheet having a thickness of 6.3 mm as a test piece. Condition: 25% deformation at 70° C.×72 hrs.

7) Adhesion:

A sheet of the following resins was molded on an 80 ton injection molding machine under the following injection condition I, and was cut into resin plates of 150 mm×25 mm×4mm.

Resins ionomer resin, HM 2500 BK, ex Mitsui-Du Pont Inc.,
polypropylene resin, CJ-700, ex Mitsui Chemical Co.

Injection Condition I

| injection molding machine | FS-120, ex Nissei Resin Industries Inc, |
| molding temperature | 200° C., |
| injection rate | 55 mm/sec., |
| injection pressure | 1400 kg/cm$^2$, |
| holding pressure | 400 kg/cm$^2$, |
| injection time | 6 seconds, |
| cooling time | 45 seconds. |

Figure 2:
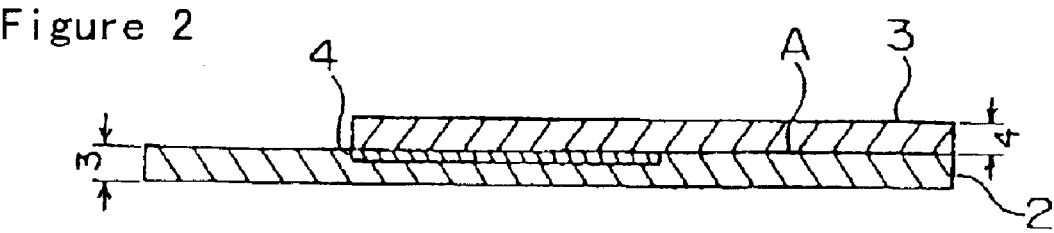
FIG. 2 is a schematic longitudinal sectional view of a specimen for the evaluation of adhesion.

A sheet of paper was stuck on the resin plate thus obtained with an adhesive double coated tape as shown in FIG. 2. This was inserted into a mold, on which the present composition was injection molded under the following injection condition II to prepare a specimen as shown in FIGS. 1 and 2.

Injection Condition II

| injection molding machine | FS-120, ex Nissei Resin Industries Inc., |
| molding temperature | 200° C., |
| injection rate | 55 mm/sec., |
| injection pressure | 1400 kg/cm$^2$, |
| holding pressure | 0 kg/cm$^2$, |
| injection time | 6 seconds, |
| cooling time | 45 seconds. |

Figure 3:
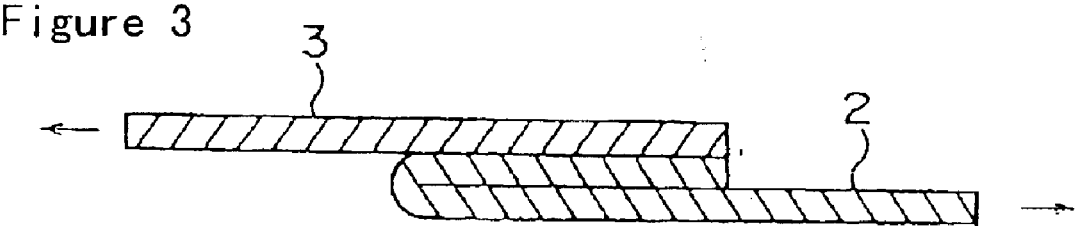
FIG. 3 is a drawing for illustrating the method for the evaluation of adhesion.

Then, the specimen was evaluated for delamination at 180° by bending the strip composed of the present composition and pulling each end of the resin plate and the strip in a direction of the arrow as shown in FIG. 3.

| ○ | destruction in the materials, |
| Δ | destruction between the interface, |
| X | delamination immediately after the start of the determination. |

8) Bleeding-out:

A pressed sheet of 50 mm×50 mm×1 mm was allowed to stand at 70° C. for 72 hours to observe its surface state.

| ○ | no change observed on the surface, |
| X | bleeding-out observed. |

Examples 1 to 11 and Comparison Examples 1 to 8

Each of the compositions indicated in Tables 1 and 2 was melt kneaded with a twin-screw kneader at a kneading temperature of 200 to 220° C. and a screw rotation speed of 100 rpm, and made into pellets to be used for the preparation of test pieces in the above-mentioned evaluation. The results are as shown in Tables 1 and 2.

TABLE 1

|   |   | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| (a) | PP | 100 | 100 | 100 | 100 | 100 | 100 | 100 | 100 | 100 | 100 | 100 |
| (b) | Single site-PE | 120 | 200 | 167 | 87.5 | 75 | 60 | 60 | 32 | 13 | 120 | 120 |
| (c-1) | Ionomer | 0 | 0 | 0 | 0 | 0 | 0 | 0 | 0 | 0 | 100 | 0 |
| (c-2) | EMA | 100 | 125 | 167 | 50 | 25 | 40 | 20 | 32 | 19 | 0 | 100 |
| (d) | LLDPE | 100 | 125 | 133 | 112.5 | 137.5 | 90 | 110 | 80 | 0 | 100 | 100 |
| (e) | SEPS | 160 | 200 | 333 | 87.5 | 100 | 80 | 80 | 38.4 | 0 | 160 | 160 |
| (f) | Softening agent | 160 | 200 | 433 | 75 | 75 | 60 | 50 | 25.6 | 0 | 160 | 160 |
| (g) | Filler | 80 | 150 | 200 | 350 | 200 | 0 | 260 | 80 | 0 | 80 | 80 |
| (h) | Peroxide | 0 | 0 | 0 | 0 | 0 | 0 | 0 | 0 | 0 | 0 | 1 |
| (i) | Crosslinking aid | 0 | 0 | 0 | 0 | 0 | 0 | 0 | 0 | 0 | 0 | 3 |
|   | Specifity gravity | 0.96 | 1.15 | 0.98 | 1.22 | 1.1 | 0.91 | 1.21 | 1.04 | 0.91 | 0.96 | 0.96 |
|   | Hardness | 83 | 94 | 70 | 95 | 94 | 90 | 97 | 95 | 98 | 83 | 88 |
|   | Tensile strength (Mpa) | 16 | 11.4 | 11 | 9 | 17.7 | 19.6 | 13.4 | 17.8 | 28.3 | 16 | 17.3 |
|   | Modulus at 100% elongation (Mpa) | 4.4 | 9 | 2.7 | — | 8.9 | 6.3 | 10.8 | 12.4 | — | 4.3 | 4.9 |
|   | Tensile elongation (%) | 770 | 610 | 800 | 50 | 730 | 740 | 606 | 611 | 72 | 780 | 700 |
|   | Compression set (%) | 55 | 58 | 38 | 63 | 60 | 54 | 72 | 75 | 85 | 55 | 41 |
|   | Adhesion to the ionomer resin | ○ | ○ | ○ | ○ | ○ | ○ | ○ | ○ | ○ | ○ | ○ |
|   | Adhesion to the polypropylene resin | ○ | ○ | ○ | ○ | ○ | ○ | ○ | ○ | ○ | ○ | ○ |
|   | Bleeding-out | ○ | ○ | ○ | ○ | ○ | ○ | ○ | ○ | ○ | ○ | ○ |

TABLE 2

|   |   | Comparison Example 1 | Comparison Example 2 | Comparison Example 3 | Comparison Example 4 | Comparison Example 5 | Comparison Example 6 | Comparison Example 7 | Comparison Example 8 |
|---|---|---|---|---|---|---|---|---|---|
| (a) | PP | 100 | 100 | 100 | 100 | 100 | 100 | 100 | 100 |
| (b) | Single site-PE | 0 | 400 | 120 | 120 | 120 | 120 | 120 | 120 |
| (c-1) | Ionomer | 0 | 0 | 0 | 0 | 250 | 0 | 0 | 0 |
| (c-2) | EMA | 100 | 100 | 0 | 250 | 0 | 100 | 100 | 100 |
| (d) | LLDPE | 100 | 100 | 100 | 100 | 100 | 100 | 100 | 250 |
| (e) | SEPS | 160 | 160 | 160 | 160 | 160 | 450 | 160 | 160 |
| (f) | Softening agent | 160 | 160 | 160 | 160 | 160 | 160 | 550 | 160 |
| (g) | Filler | 80 | 80 | 80 | 80 | 80 | 80 | 80 | 80 |
|   | Specifity gravity | 0.96 | 0.93 | 0.96 | 0.96 | 0.96 | 0.94 | 0.93 | 0.96 |
|   | Hardness | 83 | 87 | 72 | 97 | 97 | 70 | 56 | 96 |
|   | Tensile strength (Mpa) | 19.6 | 13.5 | 15.8 | 20.7 | 20.1 | 24 | 7.8 | 19.6 |
|   | Modulus at 100% elongation (Mpa) | 4.2 | 5.2 | 3.8 | 5.5 | 5.2 | 2.4 | 1.7 | 5.3 |
|   | Tensile elongation (%) | 820 | 1000 | 870 | 900 | 870 | 950 | 960 | 850 |
|   | Compression set (%) | 40 | 60 | 41 | 49 | 51 | 38 | 37 | 50 |
|   | Adhesion to the ionomer resin | Δ | Δ | X | ○ | ○ | X | X | Δ |
|   | Adhesion to the polypropylene resin | ○ | ○ | ○ | Δ | Δ | ○ | ○ | ○ |
|   | Bleeding-out | X | X | ○ | X | X | ○ | X | X |

The resin compositions in Examples 1 to 11 were according to the the present invention. They were all excellent in adhesion to both of the ionomer resin and the polypropylene resin and had good mechanical properties. In addition, no bleeding-out of the softening agent was observed and softness of the shaped article could be easily controlled. Component (c-2) was used as component (c) in Example 1, while component (c-1) was used as component (c) in Example 10. The both exhibited nearly same properties.

On the other hand, component (b) was not blended in Comparison Example 1, unlike in Example 1. It was found that adhesion to the ionomer resin was bad and bleeding-out of the softening agent was observed. In Comparison Example 2, component (b) was blended in an amount above the present specified range. It was found that adhesion to the ionomer resin was bad and bleeding-out of the softening agent was observed. In addition, the deterioration of mechanical properties was observed. In Comparison Example 3, component (c-2) was not blended. Adhesion to the ionomer resin reduced remarkably. In Comparison Example 4, component (c-2) was blended in an amount above the present specified range. It was found that adhesion to the polypropylene resin was bad and bleeding-out of the softening agent was observed. In Comparison Example 5, component (c-1) was blended in an amount above the present specified range, in contrast to Example 10. It was found that adhesion to the polypropylene resin was bad and bleeding-out of the softening agent was observed. In Comparison Examples 6 and 7, components (e) and (f) were blended in an amount above the present specified ranges, respectively, in contrast to Example 1 In both Comparison Examples it was found that adhesion to the ionomer resin was extremely bad. In Comparison Example 7, bleeding-out of the softening agent occurred remarkably. In Comparison Example 8, component (d) was blended in an amount above the present specified range, in contrast to Example 1. It was found that adhesion to the ionomer resin was bad and remarkable bleeding-out of the softening agent was observed.

What is claimed is:

1. A laminated article comprising a layer of a thermoplastic resin composition consisting essentially of
   (a) 100 parts by weight of a resin selected from the group consisting of polypropylenes and copolymers composed mainly of propylene,
   (b) 5 to 350 parts by weight of a resin selected from the group consisting of polyethylenes and copolymers composed mainly of ethylene, the resin having been prepared using a single site catalyst,
   (c) 5 to 200 parts by weight of a resin selected from the group consisting of
       (c-1) ethylenic ionomer resins, and
       (c-2) polymers and copolymers of 100 to 5% by weight of a monomer represented by the following formula (I):

$$CH_2=C(R^1)-COOR^2 \qquad (I)$$

wherein $R^1$ represents a hydrogen atom or a methyl group, and $R^2$ represents a hydrogen atom or an alkyl group having 1 to 10 carbon atoms,
       with 0 to 95% by weight of ethylene,
   (d) 0 to 200 parts by weight of a resin selected from the group consisting of polyethylenes and copolymers composed mainly of ethylene, precluding those prepared using a single site catalyst,
   (e) 0 to 400 parts by weight of a block copolymer consisting essentially of at least two polymeric blocks (A) composed mainly of a vinyl aromatic compound and at least one polymeric block (B) composed mainly of a conjugated diene compound, or hydrogenated block copolymer obtained by hydrogenating said block copolymer, and
   (f) 0 to 500 parts by weight of a non-aromatic softening agent for rubber.

2. An article according to claim 1, wherein the article is a molding for automobiles.

3. An article according to claim 2, wherein the molding for automobiles is a window molding, a roof molding, a protector molding, a weather molding or a strip molding.

4. A laminated article comprising a layer of a thermoplastic resin composition consisting essentially of
   (a) 100 parts by weight of a resin selected from the group consisting of polypropylenes and copolymers composed mainly of propylene,
   (b) 5 to 350 parts by weight of a resin selected from the group consisting of polyethylenes and copolymers composed mainly of ethylene, the resin having been prepared using a single site catalyst,
   (c) 5 to 200 parts by weight of a resin selected from the group consisting of
       (c-1) ethylenic ionomer resins, and
       (c-2) polymers and copolymers of 100 to 5% by weight of a monomer represented by the following formula (I):

$$CH_2=C(R^1)-COOR^2 \qquad (I)$$

wherein $R^1$ represents a hydrogen atom or a methyl group, and $R^2$ represents a hydrogen atom or an alkyl group having 1 to 10 carbon atoms,
       with 0 to 95% by weight of ethylene,
   (d) 0 to 200 parts by weight of a resin selected from the group consisting of polyethylenes and copolymers composed mainly of ethylene, precluding those prepared using a single site catalyst,
   (e) 0 to 400 parts by weight of a block copolymer consisting essentially of at least two polymeric blocks (A) composed mainly of a vinyl aromatic compound and at least one polymeric block (B) composed mainly of a conjugated diene compound, or a hydrogenated block copolymer obtained by hydrogenating said block copolymer, and
   (f) 0 to 500 parts by weight of a non-aromatic softening agent for rubber, and a layer of one or more resins selected from the group consisting of polar resins selected from the group consisting of ethylene-acrylic acid copolymers, ethylene-methacrylic acid copolymers, ethylene-acrylic acid ester copolymers, ethylene-methacrylic acid ester copolymers, ethylene-vinyl acetate copolymers, saponified ethylene-vinyl acetate copolymers and ionomer resins, and non-polar resins selected from the group consisting of non-polar polyolefinic resins and non-polar polystyrenic resins.

5. A laminated article according to claim 4, wherein the non-polar polyolefinic resins include polypropylenes, propylene-α-olefin copolymers, polyethylenes, ethylene-α-olefin copolymeric rubbers, polybutenes, polyisobutylenes, polybutadienes (BR), poly-4-methylpentene-1 resins, and olefinic thermoplastic elastomers.

6. A laminated article according to claim 4, wherein the non-polar polystyrenic resins include polystyrenes, styrenic copolymeric rubbers, and styrenic thermoplastic elastomers.

7. A laminated article according to claim 6, wherein the styrenic copolymeric rubbers include SBR, SBS, SIS, SIBS, SEBS, and SEEPS.

8. A shaped article having a core comprising a thermoplastic resin composition consisting essentially of
   (a) 100 parts by weight of a resin selected from the group consisting of polypropylenes and copolymers composed mainly of propylene,
   (b) 5 to 350 parts by weight of a resin selected from the group consisting of polyethylenes and copolymers composed mainly of ethylene, the resin having been prepared using a single catalyst,
   (c) 5 to 200 parts by weight of a resin selected from the group consisting of
       (c-1) ethylenic ionomer resins, and
       (c-2) polymers and copolymers of 100 to 5% by weight of a monomer represented by the following formula (I):

$$CH_2=C(R^1)-COOR^2 \qquad (I)$$

wherein $R^1$ represents a hydrogen atom or a methyl group, and $R^2$ represents a hydrogen atom or an alkyl group having 1 to 10 carbon atoms,
       with 0 to 95% by weight of ethylene,
   (d) 0 to 200 parts by weight of a resin selected from the group consisting of polyethylenes and copolymers composed mainly of ethylene, precluding those prepared using a single site catalyst,
   (e) 0 to 400 parts by weight of a block copolymer consisting essentially of at least two polymeric blocks (A) composed mainly of a vinyl aromatic compound and at least one polymeric block (B) composed mainly of a conjugated diene compound or a hydrogenated block copolymer obtained by hydrogenating said block copolymer, and (f) 0 to 500 parts by weight of a non-aromatic softening agent for rubber, and a surface layer of a polar resin and a lip of a non-polar resin.

9. A shaped article according to claim 8, wherein said polar resin is selected from the group consisting of ethylene-acrylic acid copolymers, ethylene-methacrylic acid copolymers, ethylene-acrylic acid ester copolymers, ethylene-methacrylic acid ester copolymers, ethylene-vinyl acetate copolymers, saponified ethylene-vinyl acetate copolymers and ionomer resins, and said non-polar resin is selected from the group consisting of non-polar polyolefinic resins and non-polar polystyrenic resins.

10. A shaped article according to claim 8, wherein said polar resin is an ionomer resin and said non-polar resin is a polyolefinic thermoplastic elastomer or a styrenic thermoplastic elastomer.

* * * * *